US010204296B2

(12) United States Patent
Clere et al.

(10) Patent No.: US 10,204,296 B2
(45) Date of Patent: Feb. 12, 2019

(54) METHOD FOR AUTHENTICATION OF THE CLOSURE ASSEMBLY OF A CONTAINER

(71) Applicant: LES BOUCHAGES DELAGE, Gensac la Pallue (FR)

(72) Inventors: Laurent Clere, Cognac (FR); Christophe Loustaudaudine, Thyez (FR)

(73) Assignee: LES BOUCHAGES DELAGE (FR)

( * ) Notice: Subject to any disclaimer, the term of this patent is extended or adjusted under 35 U.S.C. 154(b) by 0 days.

(21) Appl. No.: 15/521,981

(22) PCT Filed: Oct. 23, 2015

(86) PCT No.: PCT/EP2015/074627
§ 371 (c)(1),
(2) Date: Jun. 27, 2017

(87) PCT Pub. No.: WO2016/066548
PCT Pub. Date: May 6, 2016

(65) Prior Publication Data
US 2017/0316302 A1 Nov. 2, 2017

(30) Foreign Application Priority Data
Oct. 27, 2014 (FR) ..................................... 14 60306

(51) Int. Cl.
*G06K 7/08* (2006.01)
*G06K 19/06* (2006.01)
(Continued)

(52) U.S. Cl.
CPC ... *G06K 19/07758* (2013.01); *G06K 7/10366* (2013.01); *G06K 19/0723* (2013.01);
(Continued)

(58) Field of Classification Search
USPC .................................. 235/375, 383, 451, 492
See application file for complete search history.

(56) References Cited

U.S. PATENT DOCUMENTS

2002/0170966 A1* 11/2002 Hannigan ............. G06F 3/0317
235/462.01
2002/0185544 A1 12/2002 Baillod et al.
(Continued)

FOREIGN PATENT DOCUMENTS

| FR | 2667576 | 4/1992 |
| WO | 03038767 | 5/2003 |
| WO | 2014037666 | 3/2014 |

OTHER PUBLICATIONS

International Search Report, International Application No. PCT/EP2015/074627 dated Jan. 18, 2016.

*Primary Examiner* — Tuyen K Vo
(74) *Attorney, Agent, or Firm* — Perman & Green, LLP

(57) ABSTRACT

A method for authenticating a closure assembly of a container including a closure and an overpack covering at least the closure. The overpack, including a first radio frequency identification tag having a first unique identifier, the method includes reading the first unique identifier, the closure including a second radio frequency identification tag including a second unique identifier and a storage unit including at least data relating to an overpack/closure pair including the unique identifiers of a closure and an overpack associated with the closure, reading the first unique identifier and comparing the identifiers of the overpack and of the closure thus read to verify that the pair being authenticated does coincide with the pair defined in the data assembly, emitting a communication signal corresponding to the result of the verification, the closure assembly including means for destroying at least one of the identification tags when the container is opened.

14 Claims, 2 Drawing Sheets

(51) Int. Cl.
*G06K 19/077* (2006.01)
*G06K 19/10* (2006.01)
*G06K 19/14* (2006.01)
*G06K 7/10* (2006.01)
*G06K 19/07* (2006.01)

(52) U.S. Cl.
CPC ....... *G06K 19/07798* (2013.01); *G06K 19/10* (2013.01); *G06K 19/145* (2013.01)

(56) References Cited

U.S. PATENT DOCUMENTS

| | | |
|---|---|---|
| 2005/0197738 A1* | 9/2005 | Morrison ................ G01C 9/00 700/231 |
| 2006/0086791 A1 | 4/2006 | Austin |
| 2015/0235234 A1 | 8/2015 | Hoegh-Guldberg |
| 2016/0063830 A1* | 3/2016 | Glamuzina, Jr. .. G08B 13/2428 340/572.1 |
| 2017/0076568 A1* | 3/2017 | Glamuzina, Jr. .. G08B 13/2428 |

\* cited by examiner

METHOD FOR AUTHENTICATION OF THE CLOSURE ASSEMBLY OF A CONTAINER

CROSS REFERENCE TO RELATED APPLICATIONS

This Application is the National Stage of International Application No. PCT/EP2015/074627, having an International Filing Date of 23 Oct. 2015, which designated the United States of America, and which International Application was published under PCT Article 21 (2) as WO 2016/066548 A1, and which claims priority from and the benefit of French Application No. 1460306, filed on 27 Oct. 2014, the disclosures of which are incorporated herein by reference in their entireties.

BACKGROUND

1. Field

The presently disclosed embodiment relates to a method for authenticating the closure assembly of a container in order to establish the integrity and authenticity of the contents of this container.

The presently disclosed embodiment also relates to a closure assembly for the implementation of this authentication method.

2. Brief Description of Related Developments

Closing a container having a neck, which comprises an inside opening for the passage of a fluid contained in this container, with a closure assembly comprising a stopper and a cap, is a common practice.

This cap, which may be a heat-shrinkable sleeve, covers the stopper and a portion of the neck so as to bond said stopper to the container. It also covers this container.

The terra "stopper" is understood to mean a mass shutter, in particular intended to close a container by being inserted by force into the neck of this container.

It is also known that certain forgers use empty bottles and stoppers belonging to famous wineries or producers of spirits of great notoriety to mislead consumers on the actual contents of these bottles by filling them with liquids of lesser quality.

In recent years, various technical solutions have been developed to try to combat this counterfeiting in rapid expansion.

A known solution entails caps having invisible signs such as drawings which are only revealed by exposure of these caps to ultraviolet light.

However, such a solution can be copied quite easily by forgers.

Also known are the so-called tamper-proof wire-clips intended to guarantee the contents of a bottle before first use by forming an overpack which ultimately imprisons the closure of this bottle.

While providing good results, such a technical solution can be further improved.

On the one hand, it can be foe quite unsightly.

On the other hand, the malicious release of the wire-clip leaves no visible sign on the bottle. The bottle may foe presented to the final consumer after the contents have been exchanged without the latter having any means at his disposal enabling him to ascertain the infringement.

Moreover, the solutions of the prior art recalled above cannot contain any specific information on the contents of the bottle.

It is also known to use tags implementing a contactless RFID (Radio Frequency Identification) identification solution as an anti-theft device.

Typically, such a tag is pasted to the surface of the container which it protects, for example over the overpack of a cosmetic product.

However, a fairly easy way to bypass such an anti-theft device is to detach the latter from its support.

This solution has, however, recently been implemented to protect the contents of a bottle provided with a neck and containing a liquid such as a wine or a spirit.

It has thus been proposed to insert an RFID tag in the neck of the bottle by placing it between the stopper and the cap covering the upper part of this bottle.

To deter a possible forger from exchanging the contents of the bottle, this RFID tag is automatically deactivated as soon as the capsule is removed.

Although such a device contributes to strengthening the protection of the contents of a bottle by making counterfeiting more complicated, it may still be insufficient to guarantee the authenticity of so-called "premium" beverages.

Indeed, forgers of organized networks are ready to produce and insert their own RFID tag after exchanging contents of bottles coming from wineries enjoying a high notoriety.

The presently disclosed embodiment aims to overcome the disadvantages of the prior art and to respond to the above-mentioned constraints by proposing a method for authenticating the means of closure of a container, simple in its design and in its operating mode, economical and guaranteeing the integrity and authenticity of the contents of this container.

Another object of the presently disclosed embodiment is a closure assembly for the implementation of this authentication method which allows recording data relating to the contents of the container and thus providing information to the final consumer.

SUMMARY

To this end, the disclosed embodiment relates to a method for authenticating a closure assembly of a container, this assembly comprising a closure closing an opening of this container for the passage of a fluid or at least one object contained in said container and an overpack covering at least said closure.

According to the disclosed embodiment, said overpack having a first radiofrequency identification tag which comprises a unique identifier of said overpack, the following steps are carried out:

reading the unique identifier of said overpack, said closure comprising a second radiofrequency identification tag which comprises a unique identifier of said closure and a storage unit which comprises a data set having at least data relating to an overpack/closure pair comprising the unique identifiers of a closure and of an overpack associated with said closure, reading the unique identifier of said closure and comparing the identifiers of said overpack and said closure so read with the data relating to said overpack/closure pair of said data set in order to verify that the overpack/closure pair being authenticated coincides with the overpack/closure pair defined in said data set, emitting a communication signal corresponding to the result of this verification, and said closure assembly comprises means for destroying at least one of the two identification tags as soon as the container is first opened.

For purely illustrative purposes, this fluid may be a liquid such as a wine, an alcohol, a spirit, a drug or even a perfume, or a pasty or viscous product such as a cream. Alternatively, it may be at least one solid object such as food products or drugs.

Advantageously, such a method thus enables a user or a consumer to verify the authenticity of the closure assembly and therefore to obtain a guarantee on the origin of the contents of this container, without being necessary for him to be placed in a communication coverage area (radio, internet, mobile or other) to view a remote database.

The authentication is carried out easily and locally since all the data required for this authentication of the closure assembly are contained in this assembly.

Radio frequency identification tags are advantageously RFID tags.

The overpack may be a protective overpack fitted to a stopper and, preferably, to at least a portion of the neck of the container whose opening is closed by this stopper. This overpack may, for example, foe a heat-shrinkable sleeve or casing.

Alternatively, this overpack serves to overwrap a packaged object in a primary package, this object comprising, for example, a closure of the lid type for sealing a container.

This overpack covers at least said closure and, preferably, a portion of the container.

In a particular aspect enabling to ascertain the integrity and the authenticity of the liquid content of a container such as a bottle, a flask or a carafe, the disclosed embodiment relates to a method for authenticating the closure assembly of a container comprising a container neck comprising an opening for the passage of a fluid contained therein, said opening of the container being closed by a stopper {closure} and a cap (overwrap) covering at least said stopper.

According to the disclosed embodiment, said cap comprising a first radiofrequency identification tag which comprises a unique identifier of said cap, the following steps are carried out:

reading the unique identifier of said cap, said stopper comprising a second radiofrequency identification tag which comprises a unique identifier of said stopper and a storage unit which comprises a data set having at least data relating to a cap/stopper pair comprising the unique identifiers of a stopper and a cap associated with said stopper, reading the unique identifier of said cap, and comparing the identifiers of said cap and said stopper so read with the data relating to said cap/stopper pair of said data set in order to verify that the cap/stopper pair being authenticated coincides with the cap/stopper pair defined in said data set, emitting a communication signal corresponding to the result of this verification, and said closure assembly comprises means for destroying at least one of the two identification tags as soon as the container is first opened.

Thus, this method of authentication makes it very simple to positively guarantee the integrity of the contents of a bottle.

This objective is achieved, on the one hand, by storing directly inside the stopper the unique identifiers of the stopper and of the cap associated with this stopper during the bottling step and, on the other hand, by allowing a user to read the unique identifier of the cap by means of a RFID reader and to verify the authenticity of the closure of the container by comparing the identifiers of the stopper/cap pair so read with the data of the stopper/cap pair stored in memory.

Needless to say, the protection of the contents of the bottle may be further enhanced by encrypting at least some of the data of this set before recording them on the storage unit.

This data set may also include data relating to the contents of the container and/or to the container itself, thereby providing information readily accessible to the distributor or end consumer.

For purely illustrative purposes, these data may be selected from the vintage, bottling date, bottler's name, number of bottles produced, grape variety or mixture of grape varieties, sugar content (brut, dry, extra-dry, etc.), the nominal volume of the bottle, the alcohol content, the allergen(s) present, the serving temperature and combinations thereof.

In various aspects of this authentication method, the presently disclosed embodiment also relates to the following characteristics which should foe considered singly or in all their technically possible combinations:

the steps of comparing and transmitting a communication signal corresponding to the result of this verification are carried out by a processing unit placed in said closure, before and after closing said container with said closure assembly, the following steps are carried out:

reading the unique identifier of said overpack, storing said unique identifier of said overpack in said storage unit placed in said closure by associating this unique identifier of said overpack with the unique identifier of said closure to form a specified overpack/closure pair, having encrypted at least the data relating to the overpack/closure pair by means of a coding key, said data are decrypted in the comparison step.

Alternatively, write access to said storage unit is protected by a key and an authentication algorithm to prevent any modification of the overpack/closure pair data.

the data stored in said storage unit also comprising at least data relating to said fluid or to said at least one object contained in said container, at least one command suggestion is displayed on a display means, said or at least one of said suggestions corresponding to the display of said data relating to said fluid or to said at least one object contained in said container, said second radiofrequency identification tag and said storage unit are placed in a housing inside said closure.

The presently disclosed embodiment also relates to a closure assembly for implementing the authentication method as described above, said container comprising an opening for the passage of a fluid or at least one object contained in this container.

According to the disclosed embodiment, this assembly comprises:

a closure for closing said opening, an overpack intended to cover at least said closure, said overpack comprising a first radiofrequency identification tag which comprises a unique identifier of said overpack, said closure comprising a housing receiving a second radiofrequency identification tag storing a unique identifier of said closure, and a processing unit having a storage unit for storing data, said processing unit being configured to generate and receive communication signals, and means for destroying at least one of the two identification tags as soon as the container is first opened.

For purely illustrative purposes, the second tag can be destroyed in handling of the closure to release the container opening. For example, the housing placed in the thickness of the closure and receiving the second tag may comprise a breakable zone on which this second tag is directly placed. When the closure is manipulated, breaking of this breakable zone causes the automatic tearing of part of the second tag, rendering the latter inoperative.

This container is typically a bottle, a vial or a carafe. This glass container may also be wrapped, at least in part, with wood, plastic or metal or by combinations of these elements.

This container may contain a still or sparkling wine, a spirit or other. It may also be a container such as a pot, the opening of which is closable by a screw capsule. This container can receive a pasty or viscous product, such as a cream.

In various aspects of this closure assembly, the presently disclosed embodiment also relates to the following characteristics which must be considered singly or in all their technically possible combinations:

said closure comprising a head and a body, said housing being placed in this head of the closure.

Preferably, the closure being a stopper, the stopper head is rigid or semi-rigid. The stopper body, for its part, is advantageously flexible.

said processing unit is connected to said second tag to transmit and receive said communication signals.

Alternatively, the processing unit includes a radio frequency communication means such as RFID.

the identification tag of said overpack is connected to a radiofrequency antenna structure.

the closure also comprises a source of electrical energy for supplying at least the processing unit and/or the data storage unit.

For purely illustrative purposes, this energy source is a battery.

Alternatively, at least part of the energy required for the operation of at least one of the following elements: a processing unit, a data storage unit, a communication means and an identification tag is supplied by radiofrequency by an external reader such as a mobile management unit.

such short-range wireless communication signals are based on a Near Field Communication (NFC) protocol.

said housing is formed by a sealed housing.

This housing plays several roles.

Firstly, it protects the contents of the container against possible contaminants which could come from the electronics housed in this housing.

It also ensures that the electronics function properly against chemical aggressions from the contents in the container, in particular when it is an alcohol.

Finally, it protects this electronics from possible shocks which the container so equipped with such a closure assembly can undergo.

Advantageously, this housing is made of a food-grade plastic material when the contents of the container are food. It may also be a housing made of wood, ceramic or glass.

Preferably, this housing is made of the same material as the closure.

said second radiofrequency identification tag and said processing unit are encapsulated in a hardened matrix for protecting said elements.

This matrix is preferably obtained from a cured resin. Advantageously, it is a food-grade resin when the contents of the container are food. As described above for the housing, this matrix protects the electronics from external aggressions, and allows food contact and durability of this electronics over time.

said processing unit includes security means for securing the data stored in said storage unit.

For purely illustrative purposes, these security means comprise encryption means for encrypting at least the data relating to the cap/stopper pair, and, in particular, the unique identifiers of each of these elements, before their storage on said storage unit.

The presently disclosed embodiment also relates to a container comprising a container neck which comprises an opening for the passage of a fluid contained in said container, this container being equipped with a closure assembly as described above.

The presently disclosed embodiment also relates to the use of said closure assembly as described above for the protection of wine, alcohol or spirits, medicament or pasty or viscous foodstuff, for medical or cosmetic use, contained in a bottle, a pot, a tube, a flask, a vial or a carafe.

By way of example, the container closed by this closure assembly may contain a liquid which is a cosmetic such as a perfume. In this case, the closure of said assembly may comprise a suction pump connected to a suction duct for the liquid contained in the container, this duct being immersed at least in part in the liquid received in the internal volume of the container.

BRIEF DESCRIPTION OF THE DRAWINGS

Other specific advantages, purposes and characteristics of the presently disclosed embodiment will emerge from the description which follows, given for an explanatory and non-limiting purpose, with reference to the accompanying drawings, in which.

DETAILED DESCRIPTION OF THE DRAWINGS

First of all, it should be noted that the figures are not to scale.

Figure 1:
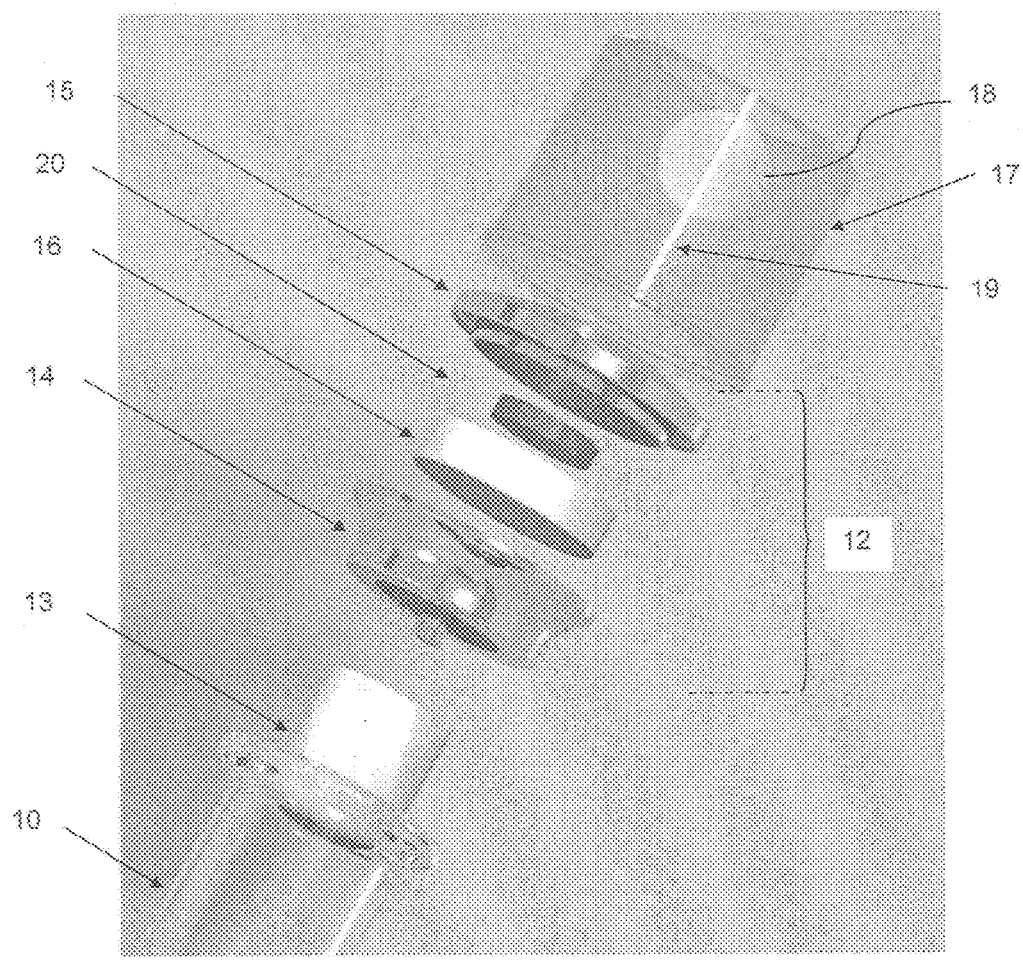
FIG. 1 schematically shows an exploded perspective view of a closure assembly of a bottle comprising a neck according to a first aspect of the presently disclosed embodiment.
Figure 2:
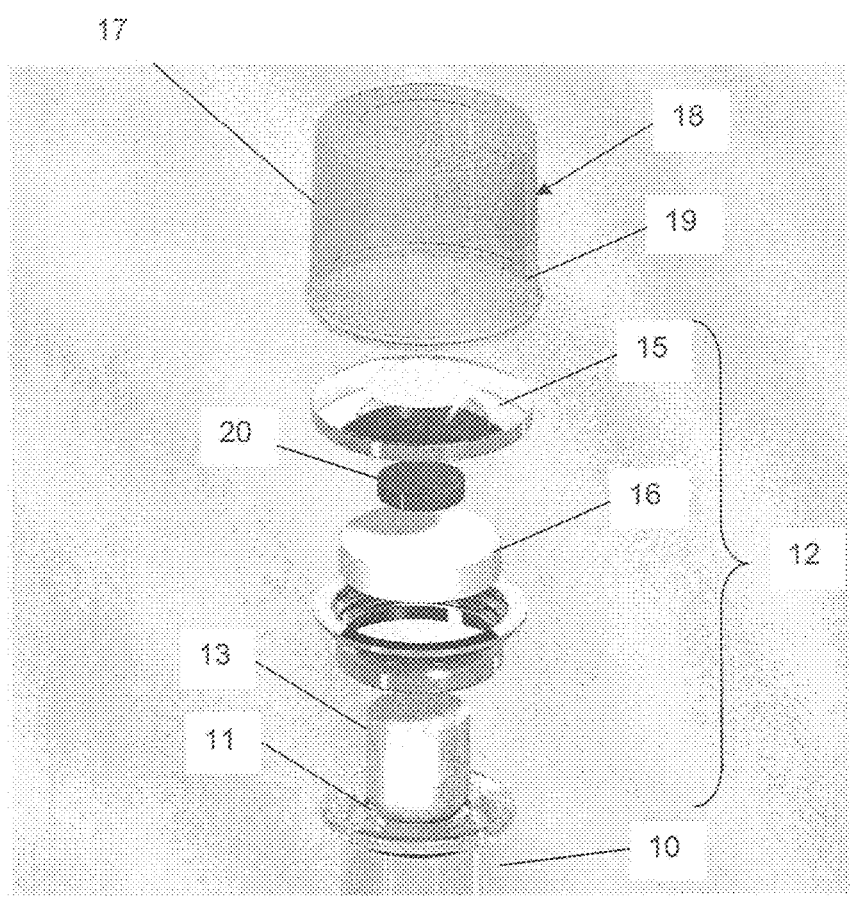
FIG. 2 is another exploded view of the closure assembly of FIG. 1.

FIGS. 1 and 2 schematically show an exploded view of a closure assembly for a container, in this case a bottle, according to a particular aspect of the presently disclosed embodiment.

This container comprises a container neck 10 having an inside opening 11 for the passage of a liquid contained in this container. This liquid is, for example, a vine or a spirit.

This opening 11 is closed by a stopper comprising a stopper-head 12 and a stopper body 13 integral with this head 12. The stopper-head 12 comprises a hollow base 14 and an ornamental element 15 forming a lid for closing and concealing a housing 16 housed in this hollow base 14 of the stopper head 12. This housing 16 has dimensions enabling it to conform to the internal wall of this base 14 so as to be held in position once inserted therein.

This housing 16 is here a metal insert while the stopper body 13 is made of a flexible material. The latter may be made of cork, agglomerated cork or an elastomer-type plastic such as a thermoplastic elastomer (TPE).

A cap 17, made here in a transparent plastic material, is intended to cover the stopper 12, 13 and a portion of the neck 10 of the container in order to fasten this stopper 12, 13 to this container.

This cap 17 comprises a first radiofrequency identification tag 18, this first tag 18 being arranged on the inside face of this cap 17 so as to be turned towards the stopper 12, 13. It is thus rendered inaccessible.

Moreover, this cap 17 is configured so as to cause the destruction of this first identification tag 18 as soon as the container is first opened.

For this purpose, this first tag 18 is placed directly on a tear strip IS of the cap 17, for example a strip called "Tircell" or, more simply, an opening strip bounded by two lines of weakness.

Thus, the removal of the cap 17 to access the stopper 12, 13 in order to open the container by manipulating the strip 19 automatically leads to the destruction of the first tag 18. An infringer cannot therefore reuse this first label 18 having a unique identifier.

The housing 16 placed in the thickness of the stopper head receives a hardened matrix 20 encapsulating and protecting an assembly having a second radiofrequency identification tag and a processor.

This second identification tag stores a unique identifier of the stopper 12, 13. The processor includes a storage unit for storing data and is configured to generate and receive communication signals.

In one aspect of the authentication method, a mobile management unit (not shown), capable of addressing and receiving communication signals based on the NFC/RFID protocol and comprising embedded software for processing these signals, is used.

This mobile management unit may be a mobile terminal, for example a mobile phone such as a smartphone or a touchpad laptop.

The mobile management unit software reads the unique identifier of the first radiofrequency identification tag 18 from the cap and then establishes an encrypted communication with the processor placed in the stopper head 12 and connected to the second radiofrequency Identification tag.

Through this communication, the software of the smartphone transmits the unique identifier of the first identification tag 18 of the cap to the software of the processor which verifies that this identifier is indeed that corresponding to the unique identifier associated with the identifier of the stopper at the outlet of the bottling line to form the pair of stopper/cap identifiers stored in the storage unit of the processor.

The processor transmits the result of the verification as a short-range communication signal to the unit. The processor of the mobile management unit displays the result of the verification on a display means of this mobile management unit.

In addition, if the mobile management unit is in a communication coverage area (telephone data, internet, etc.) with the activated data exchange, the processor of this mobile management unit may, at the user's request, connect to a spirits vendor's database to verify that the data of the "cap/stopper" pair is indeed registered in his database.

What is claimed is:

1. A method for automatically authenticating a closure assembly of a container, said assembly comprising a closure closing an opening of said container for the passage of a fluid or of at least one object contained in said container, and an overpack covering at least said closure, wherein said overpack comprises a first radio frequency identification tag having a unique identifier of said overpack, and said closure comprises a second radio frequency identification tag having a unique identifier of said closure and a processor having a storage unit, said storage unit comprising a data set comprising at least data establishing a unique relationship between an overpack/closure pair which comprises the unique identifiers of a closure and an overpack associated with this closure defining the unique relationship between the pair, and wherein the following steps are carried out:

reading the unique identifier of said overpack and reading the unique identifier of said closure with a mobile terminal comprising a NFC/RFID reader;

comparing, with said processor, the so read identifiers of said overpack and said closure together with the data set stored in the storage unit of the processor establishing the unique relationship of said overpack/closure pair in order to verify that the overpack/closure pair being authenticated coincides with the overpack/closure pair defined in said data set; and emitting a communication signal, with said processor, corresponding to the result of this verification, wherein said closure assembly comprises means for destroying at least one of the two identification tags upon the first opening of said container.

2. The method according to claim 1, wherein, before and after closing said container with said closure assembly, the following steps are carried out:

reading the unique identifier of said overpack with the mobile terminal comprising said NFC/RFID reader, storing said unique identifier of said overpack in said storage unit of the processor placed in said closure by associating said unique identifier of said overpack with the unique identifier of said closure to form a specified overpack/closure pair.

3. The method according to claim 1, wherein, after having encrypted at least the data relating to the overpack/closure pair by means of a coding key, said data is decrypted during the step of comparison.

4. The method according to claim 1, wherein the write access to said storage unit of the processor is protected by a key and an authentication algorithm to prevent any modification of the data relating to the overpack/closure.

5. The method according to claim 1, wherein the data stored in said storage unit also comprising at least data relating to said fluid or to said at least one object contained in said container, by which at least one command suggestion is displayed on a display of the mobile terminal, said suggestion or at least one of said suggestions corresponding to the display of said data relating to said fluid or to said at least one object contained in said container.

6. The method according to claim 1, wherein said second radio frequency identification tag and said processor having the storage unit are placed in an internal housing of said closure.

7. The closure assembly for carrying out the method of authentication according to claim 1, said container comprising an opening for the passage of a fluid or at least one object contained in said container, characterized in that it comprises:

the closure for closing said opening, the overpack for covering at least said closure, said overpack comprising the first radio frequency identification tag having a unique identifier of said overpack, said closure having a housing receiving the second radio frequency identification tag storing a unique identifier of said closure, and a processor having a storage unit for storing data establishing a unique relationship between an overpack/closure pair which comprises the unique identifiers of said closure and said overpack defining the unique relationship between the pair, said processor being configured to generate and receive communication signals, and means for destroying at least one of the two identification tags upon the first opening of said container.

8. The assembly according to claim 7, wherein said closure comprising a head and a body, said housing is placed in said head of the closure.

9. The assembly according to claim 7, wherein said processor is connected to said second tag to transmit and receive said communication signals.

10. The assembly according to claim 7, wherein said short range wireless communication signals are based on a Near Field Communication (NFC) protocol.

11. The assembly according to claim 7, wherein said housing is formed by a sealed housing.

12. The assembly according to claim 7, wherein said second radio frequency identification tag and said processor are encapsulated in a hardened matrix to protect these elements.

13. The container having a container neck comprising an opening therein for the passage of a fluid contained in said container, said container being equipped with the closure assembly according to claim 7.

14. The use of said assembly according to claim 7 for protecting wine, alcohol or spirits, medicament or pasty or viscous foodstuff, for medical or cosmetic use, contained in a bottle, a pot, a tube, a flask, a vial or a carafe.

* * * * *